April 23, 1929.  H. P. BUTLER  1,710,470
LIQUEFIED RUBBER COMPOSITION AND METHOD OF MAKING THE SAME
Filed April 8, 1927
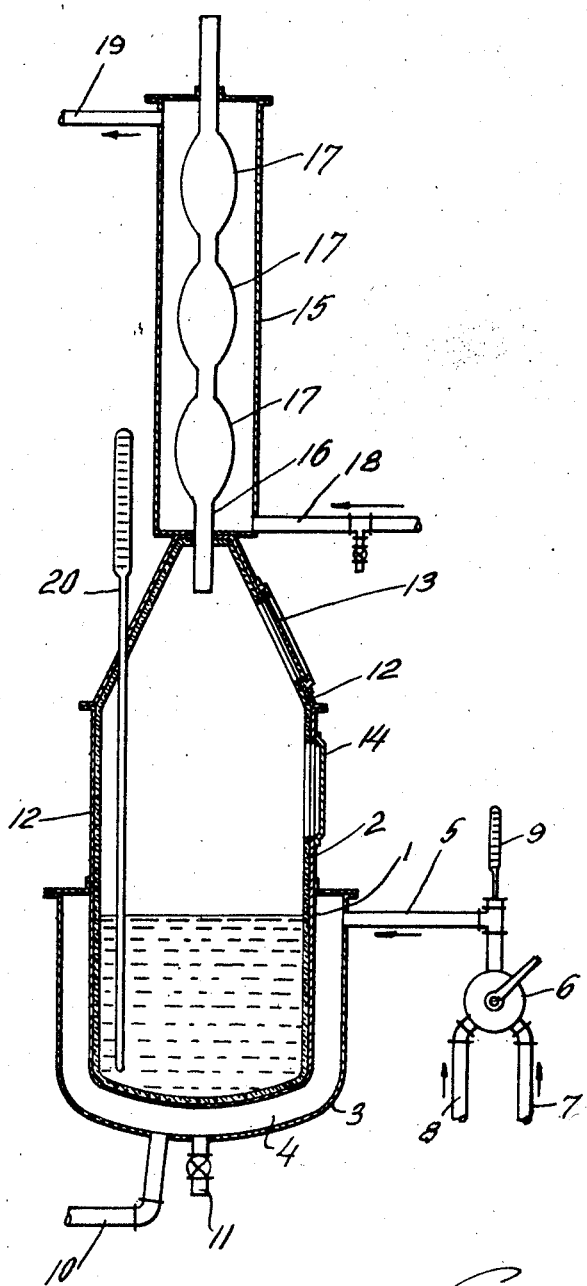
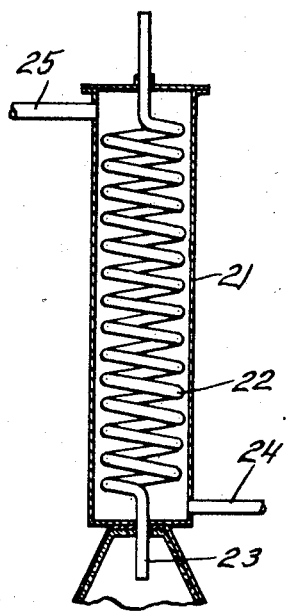
INVENTOR
Harold P. Butler
BY
ATTORNEYS Patented Apr. 23, 1929.

1,710,470

UNITED STATES PATENT OFFICE.

HAROLD PAGE BUTLER, OF NEW YORK, N. Y.

LIQUEFIED RUBBER COMPOSITION AND METHOD OF MAKING THE SAME.

Application filed April 8, 1927. Serial No. 181,932.

This invention relates to a method of liquefying rubber, and to improved rubber compositions.

This application is a continuation in part of my applications Serial Numbers 94,358 and 94,359, both filed March 12, 1926.

An object of the invention is to produce a liquefied rubber that may be readily applied to surfaces by means of a brush or spray and may be readily mixed with other ingredients having special properties for waterproofing, fireproofing and the like. The rubber is first dissolved in a suitable solvent such as benzol or toluol and is then heated to a boiling temperature. It is preferably heated in a double-jacketed kettle and the kettle is connected to a reflux condenser so that the solvent and the volatile constituents of the rubber will pass through the condenser. The condensate from the condenser is returned to the kettle and the heating is continued for a sufficient period, about two or three hours, so that all the volatile matter is removed.

In practicing the process, the rubber is placed in a suitable quantity of the solvent and allowed to stand until it is softened. It is then placed in the double-jacketed kettle and boiled at a temperature of from 100° to 120° C. to start the reaction, the temperature depending upon the boiling point of the solvent. As the volatile constituents of the solvent and the rubber are evolved, the heat is reduced to substantially 100° C. and continued from two to three hours. The condensate from the vaporized constituents is returned from the reflux condenser to the kettle and ultimately a liquefied rubber is produced which may be applied to surfaces with a brush or spray and may be mixed with other ingredients for various known uses. Thus, the liquefied rubber may be mixed with linseed oil or the like, a drier, mixed with pigment, and a properly treated commercial gum, in suitable proportions to produce a rubberized paint. Carbon tetrachloride may be added to the mixture of rubber and solvent before cooking, to render the product fireproof.

In the accompanying drawings, I have illustrated several forms of apparatus particularly useful in practicing the process.

In the drawings,

Fig. 1 is a vertical, sectional view of a double-jacketed kettle and reflux condenser associated therewith; and Fig. 2 is a similar view of another form of condenser.

The mixture of rubber and solvent is boiled in a double-jacketed kettle or still consisting of an inner container 1 preferably provided with a lining 2 of glass or other suitable inert material. An outer container surrounds the lower portion of the inner container and is spaced therefrom to provide a jacket 4. This jacket is provided with an inlet pipe 5 connected to a mixing valve 6. A steam and hot water pipe 7 is connected to the mixing valve and a cold water pipe 8 is also connected to the mixing valve so that fluid of a desired temperature may be delivered into the jacket. A thermometer 9 is arranged in the feed pipe 5. The jacket is provided with an outlet pipe 10 and with a drain pipe 11 having a valve therein. A hood 12 is arranged over the kettle and is provided with a window 13 so that the operation of the condenser may be noted from time to time. A door 14 is also provided in the hood, below the window 13. The hood is glass lined, like the kettle proper.

A reflux condenser 15 is mounted on the top of the hood and is provided with an airtight connection. The vapors from the kettle pass through an inner glass pipe 16 within the condenser which is provided with enlargements 17 at spaced intervals and cold water is adapted to circulate in the condenser casing around the vapor pipe. The cold water is delivered to the bottom of the condenser casing through an inlet pipe 18 and is discharged from the top through an outlet pipe 19. A thermometer 20 may extend through a suitable packing in the hood into the interior of the kettle.

In the form of the invention shown in Fig. 2 of the drawings, the condenser casing 21 is provided with an inner glass coil 22 having a depending pipe 23 which extends through the hood by means of which the vapors pass into the coil. Cold water is circulated through the condenser casing by means of an inlet pipe 24 and an outlet pipe 25.

In practicing the process, a quantity of rubber is dissolved in a suitable rubber solvent such as benzol or toluol and allowed to stand until the rubber becomes softened.

The dissolved rubber is then placed in the kettle 1 and hot or boiling water is delivered to the jacket 4 through the feed pipe 5, the mixing valve 6 being properly regulated to supply the water at a desired temperature. Steam may be fed through the pipe 7 if necessary to raise the temperature of the contents of the kettle to the desired value between 100° C. and 120° C. The rubber and solvent are brought to a boiling state and the fumes pass into the reflux condenser. As the condensable portion of the fumes or vapor are condensed by the cold water, they drop back into the kettle; a large portion of the non-condensable constituents of the rubber and solvent are discharged to the atmosphere. While the contents of the kettle are boiling, the temperature is reduced to approximately 100° C. and the contents of the kettle are allowed to boil for from two to three hours to permit the escape of a large portion of the non-condensable volatile matter and to bring the residue to the desired liquefied condition. The product, which is a liquefied rubber, is removed from the still and may be placed in containers ready for use.

It is desirable to have all interconnected parts of the apparatus carefully sealed to prevent accidental entrance of moisture or air.

The liquified rubber may be mixed with any suitable ingredients for mixing paint, lacquer and other similar products. A fireproofing compound may be made by adding carbon tetrachloride to the rubber before it is placed in the kettle. When the carbon tetrachloride is placed in the rubber and solvent mixture, it is preferably employed in the proportion of approximately two and one-half parts of carbon tetrachloride to one part of solvent. Sufficient solvent is employed to completely cover the rubber which is preferably in comminuted state. In charging the still or kettle a space of from four to five inches should be maintained in the top of the kettle to permit proper expansion of the volatile constitutents of the rubber and solvent in boiling .

According to one embodiment of my invention, I take from 2 to 5 ounces of crude rubber in comminuted form and cover the same with approximately 2 pints of benzol. The rubber is allowed to soak in the benzol for from 6 to 12 hours and to this may be added 4 or 5 pints of carbon tetrachloride. The mixture is then subjected to the action of the reflux condenser as described above, and the resulting product is a true liquefied rubber composition containing, in addition to the rubber itself, a quantity of the rubber solvent and the carbon tetrachloride, where this ingredient is employed.

My improved liquefied rubber composition is clearly distinguishable from the rubber jells heretofore produced and it is likewise different from the products which have been produced with the aid of linseed oil or the like, which is ordinarily combined with the rubber before subjecting the material to the action of heat. The improved composition can be applied with a brush or spray. The liquefied rubber remains flexible indefinitely and can be hardened by the addition of gums and resins or vulcanized by any of the ordinary processes of vulcanization. The liquefied rubber can be applied as a coating by any suitable coating mill or fabrics may be dipped into the liquefied rubber for waterproofing purposes.

One of the features of my invention is the combination of the liquefied rubber with a cellulose material such as pyroxylin, as described and claimed in my copending application, Serial No. 276,641, filed May 10, 1928. The pyroxylin may be poured slowly into the liquefied rubber composition and stirred until the mixture has become uniform throughout. A suitable drier may be added as in the case of ordinary paints, if it is desired to produce a quick drying material. With a quantity of liquefied rubber containing in the neighborhood of 2 to 5 ounces of rubber, I would employ approximately ½ pint to 1 pint of pyroxylin. The resulting composition is of great value as a surfacing compound for a great variety of materials. It flows easily, is waterproof, strongly adhesive, and dries to a fine finish on any surface to which it may be applied.

I claim:

1. A process of liquefying rubber consisting essentially of placing rubber and a solvent in a still, heating the mixture to a boiling temperature, subjecting the vapors to the action of a reflux condenser, and continuing the heating operation for several hours.

2. A process of liquefying rubber consisting essentially of placing rubber and a solvent in a still, heating the mixture to a temperature of 100° to 110° C. until it boils, subjecting the vapors to the action of a reflux condenser and maintaining a temperature of substantially 100° C. for two or three hours.

3. The herein described process consisting essentially of dissolving rubber in benzol, heating the solution in a still to a boiling temperature, subjecting the vapors to the action of a reflux condenser and continuing to heat the solution for several hours.

4. The herein described process consisting essentialy of dissolving rubber in a suitable solvent until the rubber becomes softened, placing the solution in a still and heating it to a boiling temperature, subjecting the vapors to the action of a reflux condenser, and continuing the heating operation for several hours.

5. The herein described process consisting essentially of comminuting rubber, dissolving the rubber in a suitable solvent, heating the solution in a still to a boiling temperature, subjecting the vapors to the action of a reflux condenser, returning the condensate to the still, and continuing the heating operation for several hours.

6. A method of making a liquefied rubber composition which comprises dissolving crude rubber in benzol in the approximate proportions of 3 to 5 ounces of crude rubber to 2 pints of benzol, adding carbon tetrachloride to the solution of rubber in the approximate proportions of 4 to 5 pints of carbon tetrachloride to 2 pints of the benzol solvent, and boiling the mixture at a temperature of between 100° C. and 120° C. and subjecting the vapors to the action of a reflux condenser.

7. A liquefied rubber composition consisting of the reaction products of rubber and a suitable solvent, selected from a group consisting of benzol, toluol and carbon tetrachloride, the combination containing substantially all of the condensible products obtainable upon boiling crude rubber dissolved in the solvent, at temperatures between 100° C. and 120° C.

In testimony whereof I affix my signature.

HAROLD PAGE BUTLER.